US012466672B2

(12) United States Patent
Coshow (10) Patent No.: US 12,466,672 B2
(45) Date of Patent: *Nov. 11, 2025

(54) LOADING DOCK SIGNAL LIGHT CHANGE INDICATOR

(71) Applicant: Light Spike Ind. LLC, Albany, OR (US)

(72) Inventor: Al Coshow, Albany, OR (US)

(73) Assignee: Light Spike Ind. LLC, Albany, OR (US)

( * ) Notice: Subject to any disclaimer, the term of this patent is extended or adjusted under 35 U.S.C. 154(b) by 390 days.

This patent is subject to a terminal disclaimer.

(21) Appl. No.: 18/158,371

(22) Filed: Jan. 23, 2023

(65) Prior Publication Data

US 2023/0159288 A1 May 25, 2023

Related U.S. Application Data

(63) Continuation-in-part of application No. 16/931,260, filed on Jul. 16, 2020, now Pat. No. 11,560,278.

(60) Provisional application No. 62/869,631, filed on Jul. 2, 2019.

(51) Int. Cl.
*B65G 69/28* (2006.01)

(52) U.S. Cl.
CPC .... *B65G 69/2882* (2013.01); *B65G 2203/044* (2013.01)

(58) Field of Classification Search
None
See application file for complete search history.

(56) References Cited

U.S. PATENT DOCUMENTS

| 4,692,755 | A | 9/1987 | Hahn |
| 4,843,373 | A | 6/1989 | Trickle et al. |
| 8,421,611 | B1 | 4/2013 | Coshow et al. |
| 10,166,920 | B2 * | 1/2019 | Nalepka ................. G06V 20/41 |
| 11,256,264 | B2 * | 2/2022 | Hoofard ................... B60D 1/62 |
| 2015/0172518 | A1 | 6/2015 | Lucas |
| 2019/0302764 | A1 | 10/2019 | Smith et al. |
| 2020/0024090 | A1 | 1/2020 | Mushynski et al. |

OTHER PUBLICATIONS

Non-Final Office Action prepared by the USPTO, U.S. Appl. No. 16/931,260, Mar. 1, 2022, pp. 1-13.

* cited by examiner

*Primary Examiner* — Adolf Dsouza
(74) *Attorney, Agent, or Firm* — Chernoff, Vilhauer LLP (57) ABSTRACT

Loading dock signal light change indicator apparatuses and systems including light sensors that detect a change from illumination of a red signal light to illumination of a green signal light from a loading dock signal light assembly, and that generate one or more detection signals in response to that detected change. The apparatuses and systems may additionally include one or more transmitters that transmits one or more wireless signals in response to the one or more light sensor signals, and a receiver that receives the one or more wireless signals from the transmitter(s). The receiver may be a mobile device, such as a smart phone. The receiver may then emit an audio, visual, an/or tactile signal in response to receiving the one or more wireless signals.

17 Claims, 6 Drawing Sheets

LOADING DOCK SIGNAL LIGHT CHANGE INDICATOR

CROSS-REFERENCE TO RELATED APPLICATIONS

This application is a continuation in part of U.S. patent application Ser. No. 16/931,260, filed on Jul. 16, 2020 and entitled "Loading Dock Signal Light Change Indicator," which claims the benefit of U.S. Provisional Patent Application Ser. No. 62/869,631, filed on Jul. 2, 2019, and entitled "Green Light Alert Docking Indicator System." The complete disclosures of the above applications are hereby incorporated by reference for all purposes.

TECHNICAL FIELD

The present disclosure relates to loading dock signal light change indicators, and more specifically to an indicator that lets the driver know of a signal light change in a red light/green signal light system mounted in a common housing mounted on the outer surface of the dock structure adjacent a dock door to advise a truck driver when it is safe to back up to a dock or depart from a dock.

BACKGROUND

Many systems have been utilized over the years to prevent the unauthorized movement of a truck toward and away from a loading dock to prevent injury to employees involved in the loading and unloading of the truck. Many of these systems have relied upon complicated, physical restraint structures which actually grip a portion of the truck or block the wheels of a truck to prevent the truck from unauthorized movement away from the loading dock. Such systems are extremely complicated and expensive to build and install and frequently can cause expensive damage to a truck.

Systems have heretofore been provided for controlling operations and indicating operations at truck docking facilities. U.S. Pat. No. 4,692,755 (Hahn) discloses a system in which signal lights are provided on the inside and outside of a dock facility to give dock personnel and truck drivers clearly visible indications of when it is safe or unsafe to load or unload a truck or to park or remove a truck, and to provide other safety features. An improvement of the system of the Hahn Patent is disclosed U.S. Pat. No. 4,843,373 (Trickle). The complete disclosures of the above Hahn and Trickle Patents are hereby incorporated by reference for all purposes. The system of the Trickle Patent includes a programmable control unit which is versatile and provides various safe and reliable modes of operation, being also operable to perform diagnostic operations. These systems have produced increased safety and efficiency in loading and unloading operations with the result that problems and the possibilities for other improvements have not been recognized.

Distribution of goods takes place on a large scale. Trucks are often used here, wherein the goods for distribution are loaded into the truck, transported, and then unloaded at a desired location. Loading usually takes place at a location where the goods are stored, produced and/or assembled, and unloading usually takes place where the goods are further distributed, processed and/or sold. During loading and unloading of the goods use is generally made here of a loading and/or unloading station for trucks, also referred to as dock, which form part of a distribution center. Because a truck can be positioned relatively closely to the dock, both goods and people can be protected relatively well from (unfavorable) weather conditions. Increases in scale make it increasingly profitable to use one or more docks for loading and unloading goods.

In the course of time there has been further innovation in the docks to enable improvement of the loading process and unloading process. Examples of such innovations are automated displacement of a loading floor (dock leveler), automated control of a door construction, detection of the presence and the position of a truck relative to the dock, and application of diverse signaling lights. However, the control and monitoring of the docks by means of local installation of required software generally results in problems as a result of outdated software and installation of required updates. This method of monitoring and control moreover results in limitations in daily use. A further risk is that, if a (part of a) dock malfunctions, this is not always noticed by the relevant dock operator, which may result in dangerous situations.

A further complication is that quite often a driver must sit and wait in his or her truck for loading to be completed. Many hours can pass before loading operations are finished requiring the driver to be on increased vigilance for increased amounts of time. If the driver were to miss the visual signaling of dock control lights, efficiency of the distribution center may be diminished. The present disclosure seeks to remedy this problem by providing a visual and audio system to alert drivers when loading is complete that does not require driver vigilance to receive the notification

SUMMARY

The present disclosure provides a truck loading and unloading status notification system, which includes an audible and visual mobile alert device. The truck loading and unloading status notification system reads a dock signal light system, such as a traditional red/green signal light system, then provides a notification through the mobile alert device when the signal light changes. The change in the dock signal light typically indicates loading (or unloading) is complete and the truck may depart the distribution or loading/unloading center.

A further understanding of the present disclosure can be obtained by reference to a preferred embodiment set forth in the accompanying Description. Although the illustrated embodiments are merely exemplary of apparatus or methods for carrying out the present disclosure, both the organization and method of operation, in general, together with further objectives and advantages thereof, may be more easily understood by reference to the illustrations and the following Description. The Drawings are not intended to limit the scope of the disclosure, but merely to clarify and exemplify the disclosure.

DETAILED DESCRIPTION

Various embodiments of the loading dock signal light change indicator apparatuses and methods according to the present disclosure are described below and illustrated in the associated drawings and appendices. Unless otherwise specified, loading dock signal light change indicator apparatuses and methods may contain at least one of the structure, components, functionality, and/or variations described, illustrated, and/or incorporated herein. Furthermore, the structures, components, functionalities, and/or variations described, illustrated, and/or incorporated herein in connection with the present teachings may be included in other loading dock signal light change indicator apparatuses and methods. The following description of various embodiments is merely illustrative in nature and is in no way intended to limit the disclosure, its application, or uses. Additionally, the advantages provided by the embodiments, as described below, are illustrative in nature and not all embodiments provide the same advantages or the same degree of advantages.

Illustrative Signal Light Change
Indicator Apparatuses and Systems

Figure 1:
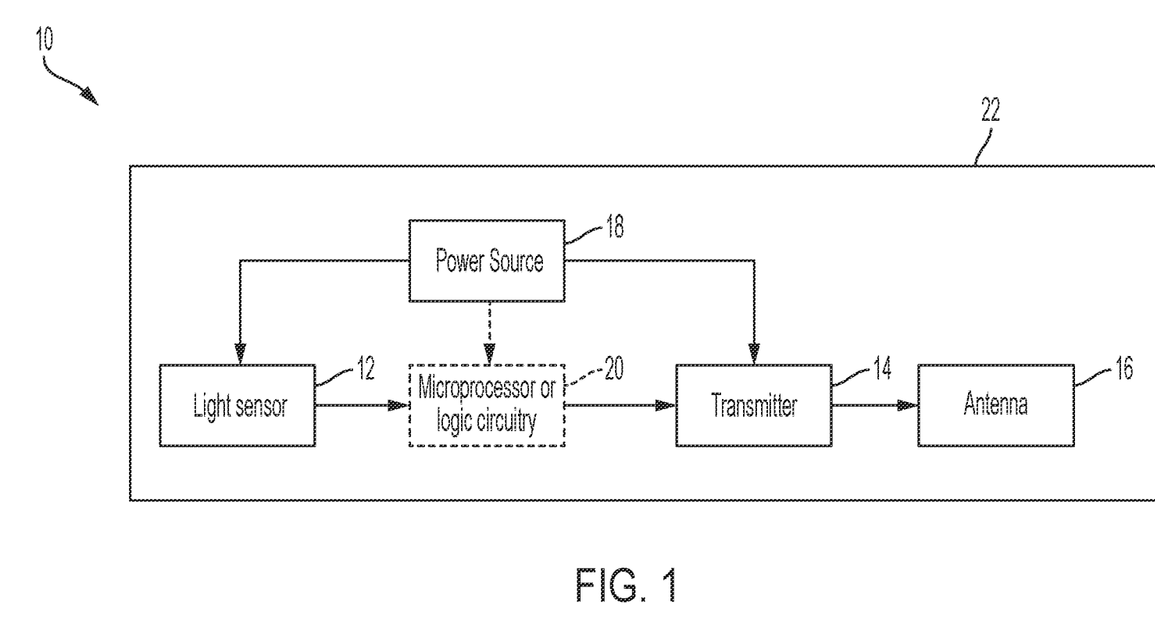
FIG. 1 is a block diagram showing components of a transmitting portion or device according to an embodiment of the present disclosure.
Figure 2:
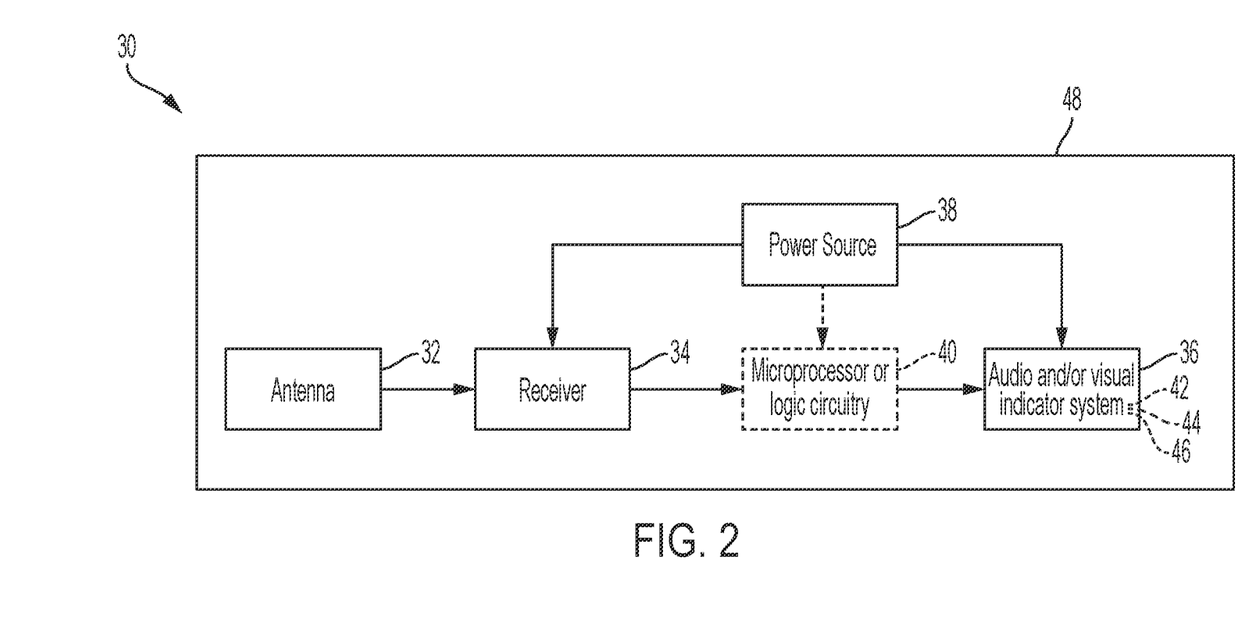
FIG. 2 is a block diagram showing components of a receiving portion or device according to an embodiment of the present disclosure.

Referring to FIGS. 1-2, the loading dock signal light change indicator system or apparatus may be comprised of a transmitting portion or device 10 (as shown in FIG. 1) (also referred to as transmitting device) and a receiving portion or device 30 (as shown in FIG. 2) (also referred to as receiving device). In one preferred embodiment, the receiving portion or device 30 is a data processing system, such as the one shown in FIG. 5. More preferably, the data processing system is a mobile device, like a cellular phone, pager, smartphone, wearable smartwatch, or tablet computer with a software application (or "app") that includes software for transmitting, receiving, or both. Alternatively, although shown in FIGS. 1-2 as separate devices or portions, both devices (or portions) may be combined into a single device in some examples of the loading dock signal light change indicator apparatus. In another preferred embodiment, one or more parts of the loading dock signal light change indicator system or apparatus is a part of a distributed data processing system/computer network, such as the one depicted in FIG. 6. For example, both the transmitting portion or device and receiving portion or device may each be one or more independent data processing systems which communicate in a distributed computer network like that of FIG. 6. In one exemplary preferred embodiment, the transmitting device may be a limited purpose computer that transmits the signal to a smartphone, which is part of the receiving device. An app on the smartphone in turn signals a smartwatch, which provides an audio/visual and/or tactile alert to the driver. In another embodiment, an app can be downloaded directly to the smartwatch.

Transmitting portion or device 10 may be retrofitted to an existing trailer axle indicator system, such as shown in U.S. Pat. No. 8,421,611, the complete disclosure of which is hereby incorporated by reference for all purposes. Alternatively, transmitting device 10 may be installed or attached as a stand-alone unit. In the example shown in FIG. 1, transmitting device 10 includes a light sensor 12, a transmitter 14, and antenna 16, and a power source 18. Transmitting device may also be fitted over or mounted on the dock signal light. The mounting may be accomplished by any means of non-permanent fastening (e.g., screws, hooks, bolts, hook-and-loop, magnets, etc.). The transmitting device 10 may also include a housing that minimizes light sources other than to the loading dock signal light.

Light sensor 12 includes any sensor that can detect a change in a loading dock signal light assembly and generate one or more detection signals based on, or in response to, that detected change. For example, the light sensor can detect a change in which light of the loading dock signal light assembly is illuminated, such as a change from illumination of only a first signal light to illumination of only a second signal light with each light having a different color, or a change from a red signal light to a green signal light. In some examples, the light sensor detects the change by a change of position of the light emitted from the loading dock signal light assembly. For example, the light sensor can detect that light was previously emitted from only a first signal light and that now light is being emitted from only a second signal light spaced from the first signal light, such as below or to the right of the first signal light. In other examples, the light sensor can detect a change in color of the light emitted from the loading dock signal light assembly, such as a change in color from red to green light regardless of the location of which portion of the loading dock signal light assembly the light is being emitted from. In further examples, the light sensor can detect both a change of location of the light being emitted and a change in color of the light being emitted from the loading dock signal light assembly. Although a single light sensor 12 is shown in FIG. 1, the transmitting device can include two or more light sensors.

Transmitter 14 receives the detection signal(s) from light sensor 12 and transmits one or more signals to receiving device 30 based on, or in response to, the detection signal(s). The signals transmitted may be the same as the detection signal(s) or may be different signal(s) based on the type of transmission performed by the transmitter. For example, transmitter 15 may be a radio transmitter so that the signals are wirelessly transmitted, such as via antenna 16, to receiving device 30. The radio transmitter can transmit the wireless signals using any suitable protocol, such as WiFi, Bluetooth, cellular, digital radio, analog radio, near-field communication, or any other transmission system described in this disclosure. In other examples, the transmission may be via a wired connection to the receiving device. In those examples, antenna 16 may be excluded from transmitting device 10.

Power source 18 provides power to one or more other components of the transmitting device, such as light sensor 12, transmitter 14, and/or a microprocessor (when included in the transmitting device). For example, power source 18 may include one or more of battery(ies), solar panel(s), fuel cell(s), and/or connections to on-board and/or offboard AC or DC power source.

In some examples, transmitting device 10 includes a microprocessor or logic circuitry 20 that receives the detection signal(s) from the light sensor and generates one or more control signals to the transmitter, which is transmitted by the transmitter. In some examples, transmitting device includes a housing 22 to contain one or more other components of the transmitting device. Although other components of transmitting device 10 is shown to be contained within housing 22, other examples of transmitting device may have one or more components located outside housing 22, such as antenna 14 and/or other component(s). In some embodiments, transmitting portion or device 10 may be a data processing system like those described in the following section or depicted in FIG. 5. For example, transmitting portion or device 10 may be comprised in whole or in part of a limited purpose computer.

In the example shown in FIG. 2, receiving device 30 includes an antenna 32, a receiver 34, an audio/visual indicator system or audio/visual device 36, and a power source 38. Antenna 32 and receiver 34 receive signals transmitted from the antenna of the transmitting device and sends those signals to audio/visual device 36 (or a microprocessor when included in the receiving device). In other embodiments, receiving device 30 may be a data processing system, such as the one shown in FIG. 5. More preferably, the data processing system is a mobile device, like a cellular phone, pager, smartphone, smartwatch, or tablet computer with a software application (or "app") that includes software for transmitting, receiving, or both.

Audio/visual device 36 provides or generates audio, visual, vibratory, and/or tactile outputs based on, or in response to, the signals received by receiver 34 from the transmitting device. For example, audio/visual device 36 may include one or more visual signaling devices 42, such as one or more lights, light emitting diodes, etc. A screen may provide updates to the driver, such as notifications on a mobile device. The visual signaling devices may illuminate and stay on ("steady state") or may flash or strobe in response to the received signals. The audio/visual device may additionally, or alternatively, include auditory signaling devices 44, such as one or more speakers, buzzer, and/or alarms. In some examples, audio/visual device 35 may include vibratory or tactile signaling devices 46, such as via one or more eccentrically mounted electric motors in the housing of the receiving device. The vibratory signaling devices may be in addition to, or instead of, the visual and/or auditory signaling devices. Audio/visual device may also be comprised of or integrated with a data processing system and utilize the data processing system's alerting outputs. The audio and visual alerts may be respectively loud or bright enough to alert the driver and nearby individuals or they may be quiet and dim enough to avoid disturbing others. The former would be useful to avoid injury while the latter may be beneficial where, for example, multiple loading docks are near each other and a loud/bright alert would confuse drivers as to which indicator light has changed. In a preferred embodiment, a smartphone, tablet computer, or smartwatch may comprise the audio/visual device. An app, downloaded to the device, would utilize the device's existing alert outputs (e.g., vibration, ringing, alarms, screen updates, notifications, text messages, etc.) and use those to notify the driver.

Power source 38 provides power to one or more other components of the receiving device, such as receiver 34, audio/visual device 36, and/or a microprocessor (when included in the receiving device). For example, power source 38 may include one or more of battery (ies), solar panel(s), fuel cell(s), and/or connections to on-board and/or offboard AC or DC power source or any power source otherwise described in this disclosure. In some examples where the transmitting and receiving devices are connected via one or more wired connections, then there may be a single power source for both devices.

In some examples, receiving device 30 includes a microprocessor or logic circuitry 40 that receives the transmitted signal(s) from receiver 34 and generates one or more control signals to audio/visual device 36. In some examples, receiving device 30 includes a housing 48 to contain one or more other components of the receiving device. Although other components of receiving device 10 is shown to be contained within housing 48, other examples of transmitting device may have one or more components located outside housing 48, such as antenna 32 and/or other component(s).

In one preferred embodiment, receiving device 30 is a singular or distributed data processing system, such as any of those described in this disclosure. For example, a smartphone, laptop, or other mobile device or a combination of mobile devices. In such an embodiment, the data processing system is designed or configured to recognize signals from the transmitting device and operate the data processing system's audio and/or visual emitters to alert the driver that the loading dock signal light indicator has changed. Illustrative data processing systems are further described below and depicted in FIGS. 5 and 6.

Figure 3:
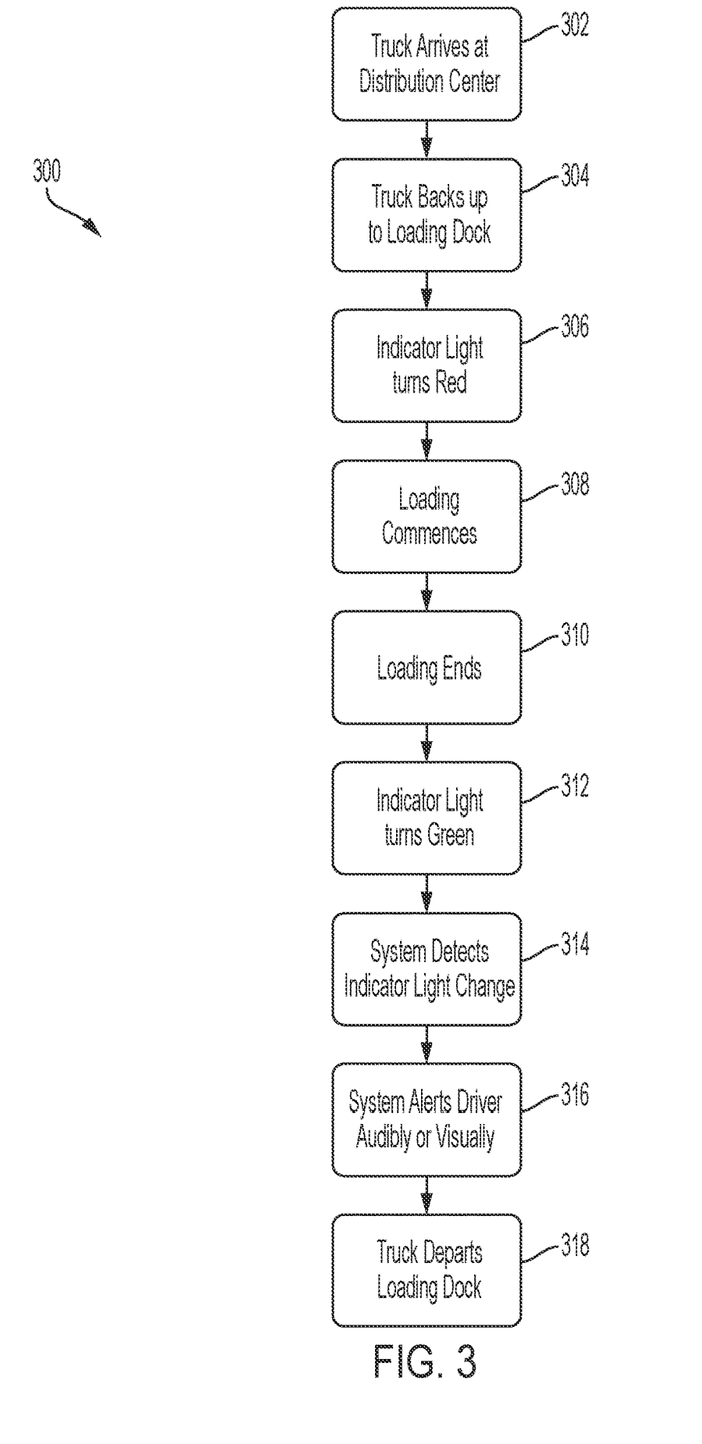
FIG. 3 is a flowchart of the loading process for a truck using a loading dock signal light change indicator apparatus according to an embodiment of the present disclosure.

Referring to FIG. 3, a method of alerting a driver in a cab of a truck is generally indicated at 300. At 302, a truck arrives at a distribution or loading/unloading center. At 304, the driver of the truck backs up to a loading dock (or loading bay) equipped with a signal light assembly or red/green dock indicator light system. The signal light assembly may include a housing having a plurality of signal lights of different colors, such as red and green. At 306, the red signal light of the signal light assembly is illuminated. At 308, loading (or unloading) commences. At 310, loading (or unloading) ends.

At 312, the red signal light of the signal light assembly ceases to be illuminated and the green signal light of the signal light assembly is illuminated. At 314, the change of illumination from the signal light assembly is detected. For example, a light sensor (e.g., located or positioned outside the cab of the truck) of the above loading dock signal light change indicator apparatus detects the change from illumination of only the red signal light to illumination of only the green signal light, and/or a change of color of the light emitted from the signal light assembly.

At 316, one or more audio, visual, vibratory, and/or tactile outputs are generated (e.g., inside the cab of the truck or in a data processing system) to alert the driver of the truck of the detected change. For example, an audio/visual device of the above loading dock signal light change indicator apparatus may generate the above output(s) based on the detected change, such as a speaker producing an audible notification, a strobe light flashing, and/or a buzzer buzzing. Alternatively, as another example, the receiving device 30 is a smartphone, which rings and/or vibrates as if the phone were receiving a call, provides a notification, or sets off an alarm. At 318, the truck departs the loading dock.

Figure 4:
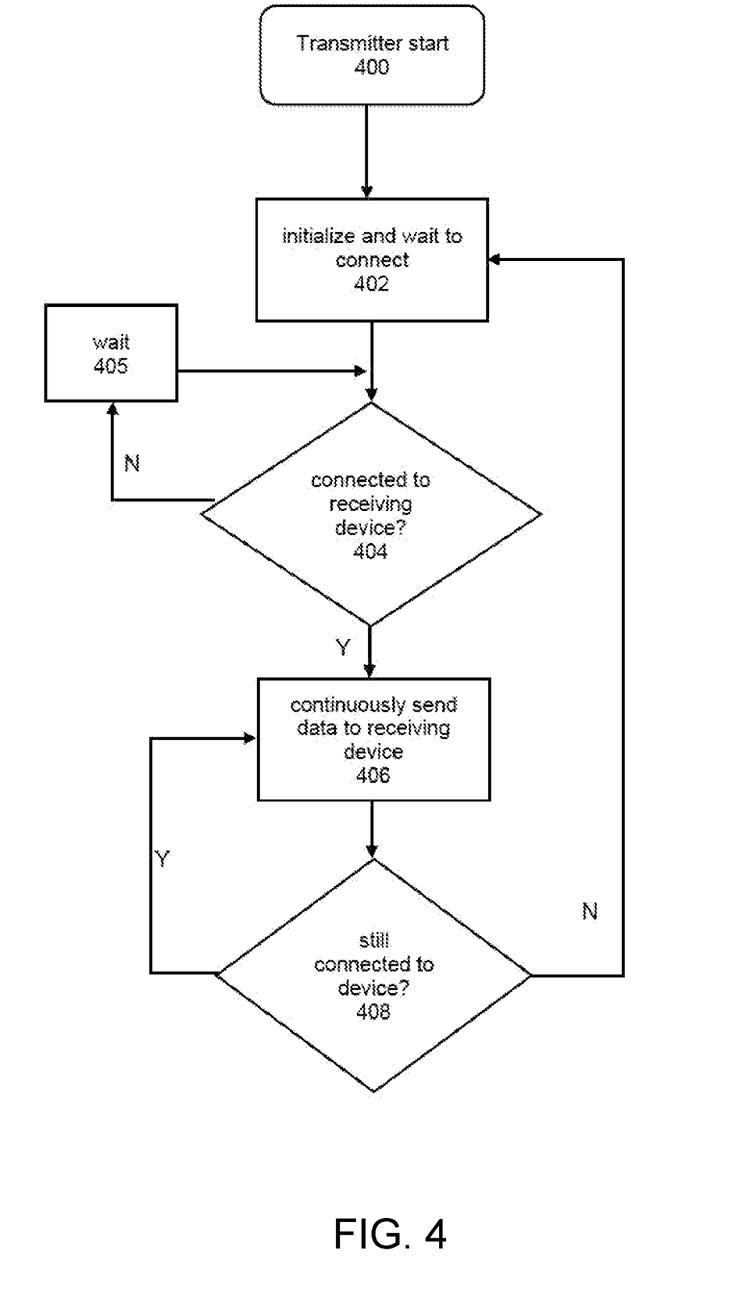
FIG. 4 is a flowchart of the process by which the transmitting portion or device connects to the mobile alert device.

Referring now to FIG. 4, one illustrative example of how transmitting portion or device 10 may connect to and maintain connection with receiving portion or device 30 while waiting to detect the signal light change, especially when such device connection is wireless (though any signal or data transmission-reception system described in this disclosure may be used in this process).

In the illustrative embodiment of FIG. 4, the transmitting device 10 is initialized and awaits connection to receiving device 30 at 402. The transmitting device 10 and receiving device 30 may use any suitable connection protocol, including any of those described in this disclosure. Furthermore, systems may be utilized to ensure that only one receiving device 30 is connected to each transmitting device 10. This is especially useful when several loading docks are near each other and utilize the disclosed loading dock signal light change indicator. For example, the transmitting device 10 may have an identifying address that the receiving device 30 uses to ensure connection to the correct system. The transmitting device 10 may only allow connection to one receiving device 30 at a time.

At 404, the transmitting device 10 determines whether it is connected to a receiving device 30. If it is not connected, it continues to wait until a connection is established 405. If connected, it continuously sends data to the receiving device 30 at 406. In other embodiments, the data transfer may be periodic, happening at regular intervals. The data transfer may be completed using any suitable data transfer system, including those described in this disclosure. The data transfer may include among other things, a repeated ping or request to determine whether the transmitting device 10 is still connected to the receiving device 30, as is shown at 408. If not connected, the transmitting device 10 of this illustrative embodiment reverts to step 402 and awaits connection. If still connected, the transmitting device 10 continues to send data to the receiving device 30.

At 406, the transmitting device 10 may also send data about the information it receives from the indicator light. In one embodiment, the transmitting device 10 sends such information to receiving device 30, and receiving device 30 interprets the indicator light information to determine whether to alert the driver. In a preferred version of that embodiment, the transmitting device 10 may send data about the luminosity and/or wavelengths of perceived light, and receiving device 30 may analyze that data to determine whether the indicator light has changed colors or to determine whether one light has turned off or on. In that embodiment, the transmitting device 10 may constantly send the data to the receiving device 30 but be unable to analyze that data itself. A benefit of this preferred embodiment is that it reduces the complexity of the transmitting device 10 and reduces the cost of implementation. The receiving device 30 may be a data processing system like a smartphone with preexisting audio, visual, or tactile alerts already on the data processing system. An app may be loaded onto the data processing system that includes software for interpreting the light wavelength data.

In another embodiment, transmitting device 10 may interpret the indicator light information and send a signal to receiving device 30 that it is time to alert the driver. In a preferred version of that embodiment, the transmitting device 10 may not send data continuously and/or periodically. Instead, at 406, it may wait to send data until it notices a change in the indicator light, then transmitting device 10 may attempt to determine whether it is still connected to receiving device 30 and, if so, send information regarding the indicator light to receiving device 30.

Illustrative Data Processing System

Figure 5:
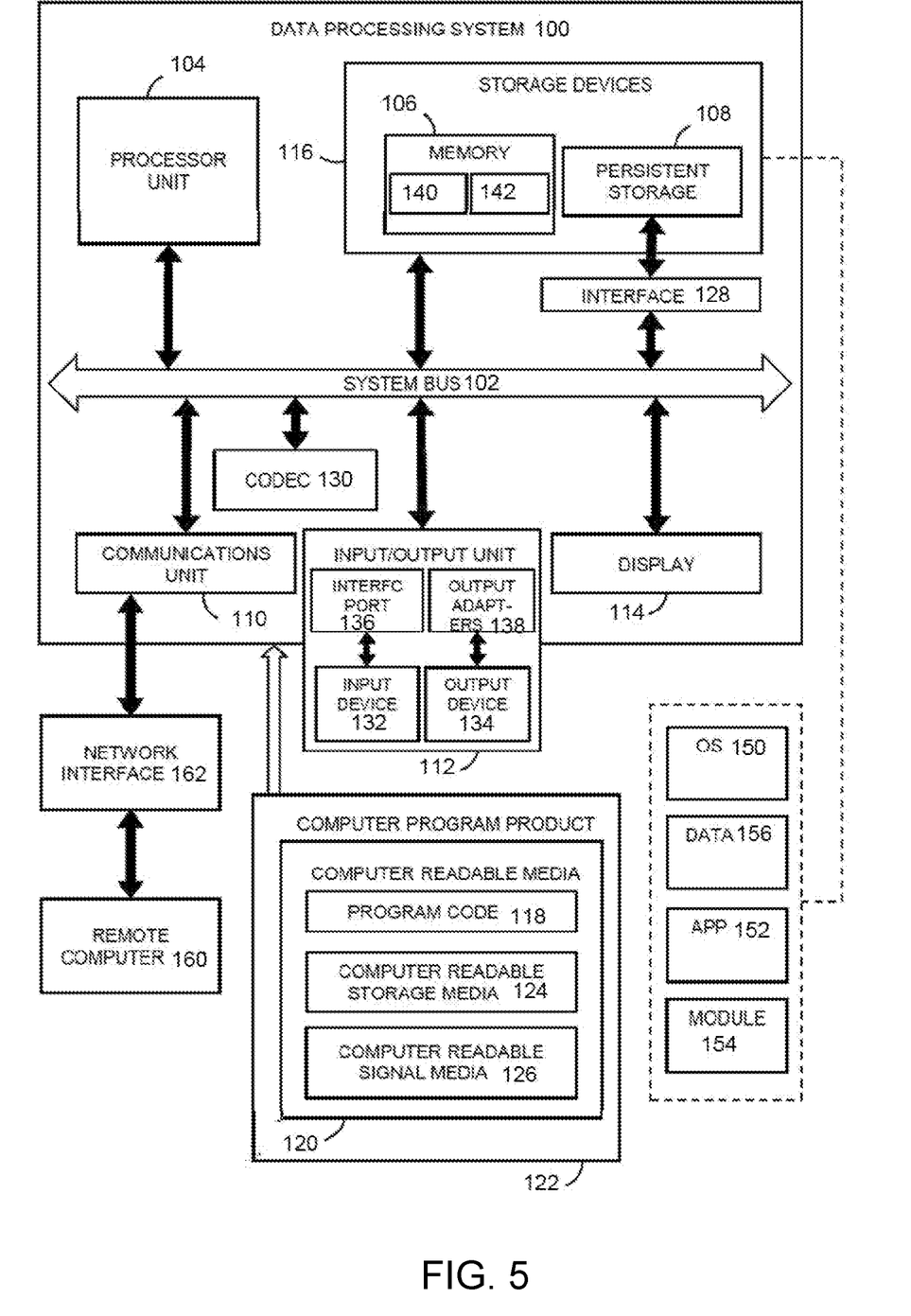
FIG. 5 is a schematic diagram of various components of an illustrative data processing system suitable for use with aspects of the present disclosure.

Referring now to FIG. 5, this example describes an illustrative data processing system 100 (also known as a computer, computing system, and/or computer system) in accordance with aspects of the present disclosure. In this example, data processing system 100 is an illustrative data processing system suitable for implementing aspects of the loading dock signal light change indicator. More specifically, in some examples, devices that are embodiments of data processing systems (e.g., smartphones, tablets, personal computers) may be used as one or more parts of transmitting device 10 and/or receiving device 30.

In this illustrative example, data processing system 100 includes a system bus 102 (also referred to as communications framework). System bus 102 may provide communications between a processor unit 104 (also referred to as a "processor" or "processors"), a memory 106, a persistent storage 108, a communications unit 110, an input/output ("I/O") unit 112, a codec 130, and/or a display 114. Memory 106, persistent storage 108, communications unit 110, I/O unit 112, display 114, and codec 130 are examples of resources that may be accessible by processor unit 104 via system bus 102.

Processor unit 104 serves to run instructions that may be loaded into memory 106. Processor unit 104 may comprise one or more processors, a multi-processor core, and/or a particular type of processor or processors (e.g., a central processing unit ("CPU"), graphics processing unit ("GPU"), etc.), depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device may include any suitable hardware capable of storing information (e.g., digital information), such as data, program code in functional form, and/or other suitable information, either on a temporary basis or a permanent basis.

Storage devices 116 also may be referred to as computer-readable storage devices or computer-readable media. Memory 106 may include a volatile storage memory 140 and a non-volatile memory 142. In some examples, a basic input/output system ("BIOS"), containing the basic routines to transfer information between elements within the data processing system 100, such as during start-up, may be stored in non-volatile memory 142. Persistent storage 108 may take various forms, depending on the implementation.

Persistent storage 108 may contain one or more components or devices. For example, persistent storage 108 may include one or more devices such as a magnetic disk drive (also referred to as a "hard disk drive" or "HDD"), solid state disk ("SSD"), floppy disk drive, tape drive, Jaz drive, Zip drive, LS-80 drive, flash memory card, memory stick, and/or the like, or any combination of these. One or more of these devices may be removable and/or portable (e.g., a removable hard drive). Persistent storage 108 may include one or more storage media separately or in combination with other storage media, including an optical disk drive such as a compact disk ROM device ("CD-ROM"), CD recordable drive ("CD-R Drive"), CD rewritable drive ("CD-RW Drive"), and/or a digital versatile disk ROM drive ("DVD-ROM"). To facilitate connection of the persistent storage devices 108 to system bus 102, a removable or non-removable interface is typically used, such as interface 128.

Input/output ("I/O") unit 112 allows for input and output of data with other devices that may be connected to data processing system 100 (i.e., input devices and output devices). For example, input device 132 may include one or more pointing and/or information-input devices such as a keyboard, a mouse, a trackball, stylus, touch pad or touch screen, microphone, joystick, game pad, satellite dish, scanner, TV tuner card, digital camera, digital video camera, web camera, and/or the like. These and other input devices may connect to processor unit 104 through system bus 102 via interface port(s) 136. Interface port(s) 136 may include, for example, a serial port, a parallel port, a game port, and/or a universal serial bus ("USB").

Output devices 134 may use some of the same types of ports, and in some cases the same actual ports, as input device(s) 132. For example, a USB port may be used to provide input to data processing system 100 and to output information from data processing system 100 to an output device 134. Output adapter 138 is provided to illustrate that there are some output devices 134 (e.g., monitors, speakers, and printers, among others) which require special adapters. Output adapters 138 may include, for example, video and sounds cards that provide a means of connection between the output device 134 and system bus 102. Other devices and/or systems of devices may provide both input and output capabilities, such as remote computer(s) 160. Display 114 may include any suitable human-machine interface or other mechanism configured to display information to a user, e.g., a CRT, LED, or LCD monitor or screen, etc.

Communications unit 110 refers to any suitable hardware and/or software employed to provide for communications with other data processing systems or devices. While communication unit 110 is shown inside data processing system 100, it may in some examples be at least partially external to data processing system 100. Communications unit 110 may include internal and external technologies, e.g., modems (including regular telephone grade modems, cable modems, and DSL modems), ISDN adapters, and/or wired and wireless Ethernet cards, hubs, routers, etc. Data processing system 100 may operate in a networked environment, using logical connections to one or more remote computers 160. A remote computer(s) 160 may include a personal computer ("PC"), a server, a router, a network PC, a workstation, a microprocessor-based appliance, a peer device, a smart phone, a tablet, another network note, and/or the like. Remote computer(s) 160 typically include many of the elements described relative to data processing system 100. Remote computer(s) 160 may be logically connected to data processing system 100 through a network interface 162 which is connected to data processing system 100 via communications unit 110. Network interface 162 encompasses wired and/or wireless communication networks, such as local-area networks ("LAN"), wide-area networks ("WAN"), and cellular networks. LAN technologies may include Fiber Distributed Data Interface ("FDDI"), Copper Distributed Data Interface ("CDDI"), Ethernet, Token Ring, and/or the like. WAN technologies include point-to-point links, circuit switching networks (e.g., Integrated Services Digital networks ("ISDN") and variations thereon), packet switching networks, and Digital Subscriber Lines ("DSL").

Codec 130 may include an encoder, a decoder, or both, comprising hardware, software, or a combination of hardware and software. Codec 130 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 130 is depicted as a separate component, codec 130 may be contained or implemented in memory, e.g., non-volatile memory 142.

Non-volatile memory 142 may include read only memory ("ROM"), programmable ROM ("PROM"), electrically programmable ROM ("EPROM"), electrically erasable programmable ROM (EEPROM), flash memory, and/or the like, or any combination of these. Volatile memory 140 may include random access memory ("RAM"), which may act as external cache memory. RAM may comprise static RAM ("SRAM"), dynamic RAM ("DRAM"), synchronous DRAM ("SDRAM"), double data rate SDRAM ("DDR SDRAM"), enhanced SDRAM ("ESDRAM"), and/or the like, or any combination of these.

Instructions for the operating system, applications, and/or programs may be located in storage devices 116, which are in communication with processor unit 104 through system bus 102. In these illustrative examples, the instructions are in a functional form in persistent storage 108. These instructions may be loaded into memory 106 for execution by processor unit 104. Processes of one or more embodiments of the present disclosure may be performed by processor unit 104 using computer-implemented instructions, which may be located in a memory, such as memory 106.

These instructions are referred to as program instructions, program code, computer usable program code, or computer-readable program code executed by a processor in processor unit 104. The program code in the different embodiments may be embodied on different physical or computer-readable storage media, such as memory 106 or persistent storage 108. Program code 118 may be located in a functional form on computer-readable media 120 that is selectively removable and may be loaded onto or transferred to data processing system 100 for execution by processor unit 104. Program code 118 and computer-readable media 120 form computer program product 122 in these examples. In one example, computer-readable media 120 may comprise computer-readable storage media 124 or computer-readable signal media 126.

Computer-readable storage media 124 may include, for example, an optical or magnetic disk that is inserted or placed into a drive or other device that is part of persistent storage 108 for transfer onto a storage device, such as a hard drive, that is part of persistent storage 108. Computer-readable storage media 124 also may take the form of a persistent storage, such as a hard drive, a thumb drive, or a flash memory, that is connected to data processing system 100. In some instances, computer-readable storage media 124 may not be removable from data processing system 100.

In these examples, computer-readable storage media 124 is a non-transitory, physical or tangible storage device used to store program code 118 rather than a medium that propagates or transmits program code 118. Computer-readable storage media 124 is also referred to as a computer-readable tangible storage device or a computer-readable physical storage device. In other words, computer-readable storage media 124 is media that can be touched by a person.

Alternatively, program code 118 may be transferred to data processing system 100, for example, remotely over a network, using computer-readable signal media 126. Computer-readable signal media 126 may be, for example, a propagated data signal containing program code 118. For example, computer-readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 118 may be downloaded over a network to persistent storage 108 from another device or data processing system through computer-readable signal media 126 for use within data processing system 100. For instance, program code stored in a computer-readable storage medium in a server data processing system may be downloaded over a network from the server to data processing system 100. The computer providing program code 118 may be a server computer, a client computer, or some other device capable of storing and transmitting program code 118.

In some examples, program code 118 may comprise part or all of an operating system ("OS") 150. Operating system 150, which may be stored on persistent storage 108, controls and allocates resources of data processing system 100. One or more applications 152 take advantage of the operating system's management of resources via program modules 154, and program data 156 stored on storage devices 116. OS 150 may include any suitable software system configured to manage and expose hardware resources of computer 100 for sharing and use by applications 152. In some examples, OS 150 provides application programming interfaces ("APIs") that facilitate connection of different type of hardware and/or provide applications 152 access to hardware and OS services. In some examples, certain applications 152 may provide further services for use by other applications 152, for example, as is the case with so-called "middleware." Aspects of present disclosure may be implemented with respect to various operating systems or combinations of operating systems.

The different components illustrated for data processing system 100 are not meant to provide architectural limitations to the way(s) different embodiments may be implemented. One or more embodiments of the present disclosure may be implemented in a data processing system that includes fewer components or includes components in addition to and/or in place of those illustrated for computer 100. Other components shown in FIG. 5 can be varied from the examples depicted. Different embodiments may be implemented using any hardware device or system capable of running program code. As one example, data processing system 100 may include organic components integrated with inorganic components and/or may be comprised entirely of organic components (excluding a human being). For example, a storage device may be comprised of an organic semiconductor.

In some examples, processor unit 104 may take the form of a hardware unit having hardware circuits that are specifically manufactured or configured for a particular use, or to produce a particular outcome or progress. This type of hardware may perform operations without needing program code 118 to be loaded into a memory from a storage device to be configured to perform the operations. For example, processor unit 104 may be a circuit system, an application specific integrated circuit ("ASIC"), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array ("FPGA"), and other suitable hardware devices. With this type of implementation, executable instructions (e.g., program code 118) may be implemented as hardware, e.g., by specifying an FPGA configuration using a hardware description language ("HDL") and then using a resulting binary file to (re) configure the FPGA.

In another example, data processing system 100 may be implemented as an FPGA-based (or in some cases ASIC-based), dedicated-purpose set of state machines (e.g., Finite State Machines ("FSM")), which may allow critical tasks to be isolated and run on custom hardware. Whereas a processor such as a CPU can be described as a shared-use, general purpose state machine that executes instructions provided to it, FPGA-based state machine(s) are constructed for a special purpose and may execute hardware-coded logic without sharing resources. Such systems are often utilized for safety-related and mission-critical tasks.

In still another illustrative example, processor unit 104 may be implemented using a combination of processors found in computers and hardware units. Processor unit 104 may have a number of hardware units and a number of processors that are configured to run program code 118. With this depicted example, some of the processes may be implemented in the number of hardware units, while other processes may be implemented in the number of processors.

In another example, system bus 102 may comprise one or more buses, such as a system bus or an input/output bus. Of course, the bus system may be implemented using any suitable type of architecture that provides for a transfer of data between different components or devices attached to the bus system. System bus 102 may include several types of bus structure(s) including memory bus or memory controller, a peripheral bus or external bus, and/or a local bus using any variety of available bus architectures (e.g., Industrial Standard Architecture ("ISA"), Micro-Channel Architecture ("MSA"), Extended ISA ("EISA"), Intelligent Drive Electronics ("IDE"), VESA Local Bus ("VLB"), Peripheral Component Interconnect ("PCI"), Card Bus, Universal Serial Bus ("USB"), Advanced Graphics Port ("AGP"), Personal Computer Memory Card International Association bus ("PCMCIA"), Firewire (IEEE 1394), and Small Computer Systems Interface ("SCSI")).

Additionally, communications unit 110 may include a number of devices that transmit data, receive data, or both transmit and receive data. Communications unit 110 may be, for example, a modem or a network adapter, two network adapters, or some combination thereof. Further, a memory may be, for example, memory 106, or a cache, such as that found in an interface and memory controller hub that may be present in system bus 102.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Illustrative Distributed Data Processing System

Figure 6:
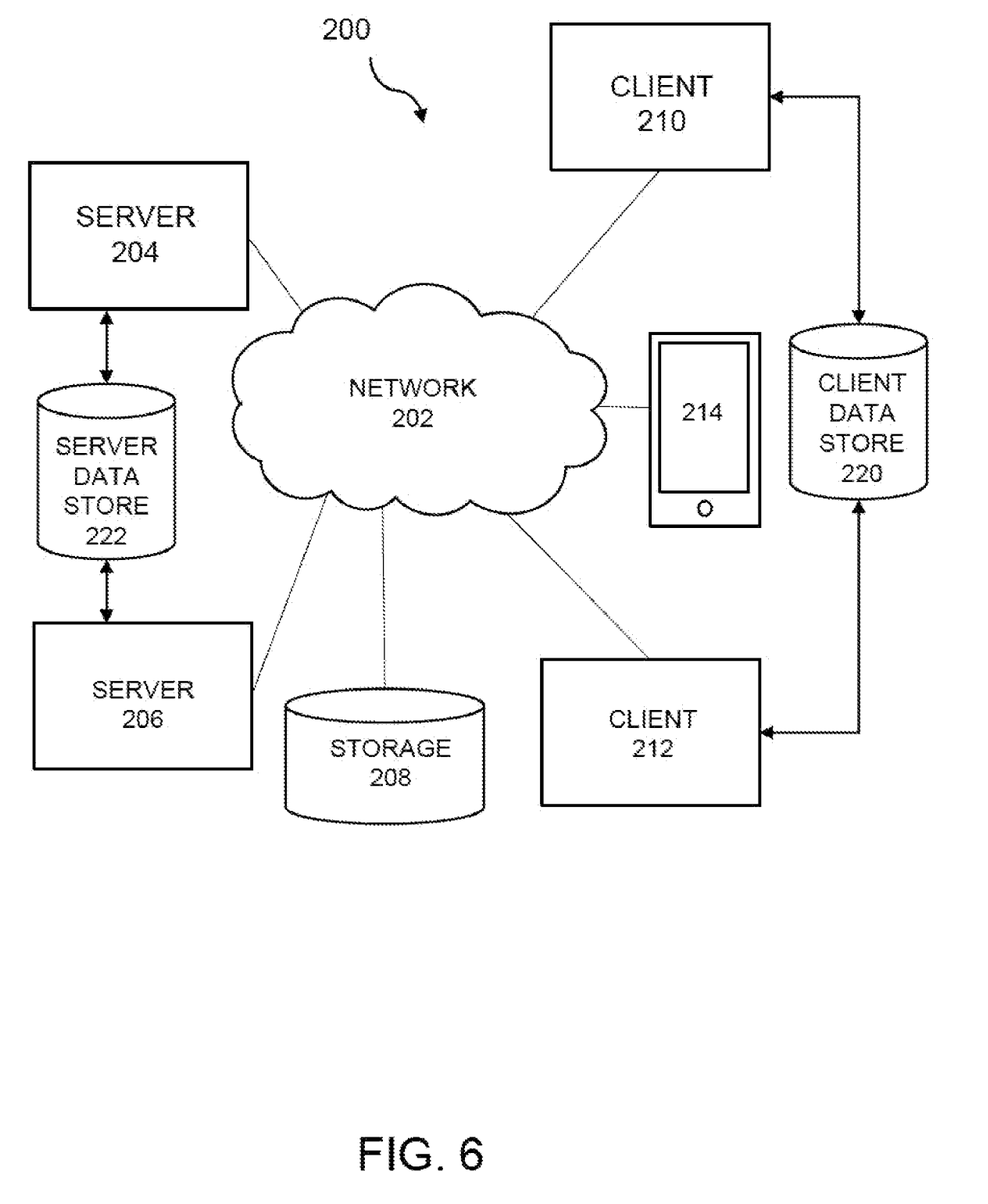
FIG. 6 is a schematic representation of an illustrative computer network suitable for use with aspects of the present disclosure.

As shown in FIG. 6, this example describes a general network data processing system 200, interchangeably termed a computer network, a network system, a distributed data processing system, or a distributed network, aspects of which may be included in one or more illustrative embodiments of the loading dock signal light change indicator systems or apparatuses described herein.

It should be appreciated that FIG. 6 is provided as an illustration of one implementation and is not intended to imply any limitation with regard to environments in which different embodiments may be implemented. Many modifications to the depicted environment may be made.

Network system 200 is a network of devices (e.g., computers), each of which may be an example of data processing system 100, and other components. Network data processing system 200 may include network 202, which is a medium configured to provide communications links between various devices and computers connected within network data processing system 200. Network 202 may include connections such as wired or wireless communication links, fiber optic cables, and/or any other suitable medium for transmitting and/or communicating data between network devices, or any combination thereof.

In the depicted example, a first network device 204 and a second network device 206 connect to network 202, as do one or more computer-readable memories or storage devices 208. Network devices 204 and 206 are examples of data processing system 100, described above. In the depicted example, devices 204 and 206 are shown as server computers, which are in communication with one or more server data store(s) 222 that may be employed to store information local to server computers 204 and 206, among others. However, network devices may include, without limitation, one or more personal computers, mobile computing devices such as personal digital assistants (PDAs), tablets, and smartphones, handheld gaming devices, wearable devices, tablet computers, routers, switches, voice gates, servers, electronic storage devices, imaging devices, media players, and/or other networked-enabled tools that may perform a mechanical or other function. These network devices may be interconnected through wired, wireless, optical, and other appropriate communication links.

In addition, client electronic devices 210 and 212 and/or a client smart device 214, may connect to network 202. Each of these devices is an example of data processing system 100, described above regarding FIG. 5. Client electronic devices 210, 212, and 214 may include, for example, one or more personal computers, network computers, and/or mobile computing devices such as personal digital assistants ("PDAs"), smart phones, handheld gaming devices, wearable devices, and/or tablet computers, and the like. In the depicted example, server 204 provides information, such as boot files, operating system images, and applications to one or more of client electronic devices 210, 212, and 214. Client electronic devices 210, 212, and 214 may be referred to as "clients" in the context of their relationship to a server such as server computer 204. Client devices may be in communication with one or more client data store(s) 220, which may be employed to store information local to the clients (e.g., cookie(s) and/or associated contextual information). Network data processing system 200 may include more or fewer servers and/or clients (or no servers or clients), as well as other devices not shown.

In some examples, first client electric device 210 may transfer an encoded file to server 204. Server 204 can store the file, decode the file, and/or transmit the file to second client electric device 212. In some examples, first client electric device 210 may transfer an uncompressed file to server 204 and server 204 may compress the file. In some examples, server 204 may encode text, audio, and/or video information, and transmit the information via network 202 to one or more clients.

Client smart device 214 may include any suitable portable electronic device capable of wireless communications and execution of software, such as a smartphone or a tablet. Generally speaking, the term "smartphone" may describe any suitable portable electronic device configured to perform functions of a computer, typically but not always having a touchscreen interface, Internet access, and an operating system capable of running downloaded applications. In addition to making phone calls (e.g., over a cellular network), smartphones may be capable of sending and receiving emails, texts, and multimedia messages, accessing the Internet, and/or functioning as a web browser. Smart devices (e.g., smartphones) may also include features of other known electronic devices, such as a media player, personal digital assistant, digital camera, video camera, and/or global positioning system. Smart devices (e.g., smartphones) may be capable of connecting with other smart devices, computers, or electronic devices wirelessly, such as through near field communications ("NFC"), BLUETOOTH®, WiFi, or mobile broadband networks. Wireless connectively may be established among smart devices, smartphones, computers, and/or other devices to form a mobile network where information can be exchanged.

Data and program code located in system 200 may be stored in or on a computer-readable storage medium, such as network-connected storage device 208 and/or a persistent storage 108 of one of the network computers, as described above, and may be downloaded to a data processing system or other device for use. For example, program code may be stored on a computer-readable storage medium on server computer 204 and downloaded to client 210 over network 202, for use on client 210. In some examples, client data store 220 and server data store 222 reside on one or more storage devices 208 and/or 108.

Network data processing system 200 may be implemented as one or more of different types of networks. For example, system 200 may include an intranet, a local area network ("LAN"), a wide area network ("WAN"), or a personal area network ("PAN"). In some examples, network data processing system 200 includes the Internet, with network 202 representing a worldwide collection of networks and gateways that use the transmission control protocol/Internet protocol ("TCP/IP") suite of protocols to communicate with one another. At the heart of the Internet is a backbone of high-speed data communication lines between major nodes or host computers. Thousands of commercial, governmental, educational, and other computer systems may be utilized to route data and messages. In some examples, network 202 may be referred to as a "cloud." In those examples, each server 204 may be referred to as a cloud computing node, and client electronic devices may be referred to as cloud consumers, or the like. FIG. 6 is intended as an example, and not as an architectural limitation for any illustrative embodiments.

Some benefits of the above disclosure include an increase in efficiency for loading and unloading tractor trailers. This translates into more trucks being processed by distribution or loading/unloading center per day, additional freight that can be moved in a given time period, reduced time driver spends at the center, and/or increased profits for the drivers of the tractor trailers. Other benefits may be realized as examples of the present disclosure are implemented throughout the transportation industry.

Although the disclosed loading dock signal light change indicator apparatus and methods have been shown and described with reference to the foregoing operational principles and preferred embodiments, it will be apparent to those skilled in the art that various changes in form and detail may be made without departing from the spirit and scope of the disclosure. The present disclosure is intended to embrace all such alternatives, modifications and variances that fall within the scope of the appended claims.

Numbered paragraphs that further define the loading dock signal light change indicator apparatus and methods of the present disclosure are provided below.

A1. A loading dock signal light change indicator apparatus, comprising:
 a light sensor that detects a change in which signal light of a loading dock signal light assembly is illuminated, and that generates one or more detection signals in response to that detected change;

a transmitter that transmits one or more signals in response to the one or more detection signals;

a receiver that receives the one or more transmitted signals from the transmitter; and an audio/visual device that generates at least one of an audio output or a visual output in response to the receiver receiving the one or more transmitted signals, wherein the audio/visual device is separate and distinct from the loading dock signal light assembly.

A2. The apparatus of paragraph A1, where the loading dock signal light assembly includes first and second signal lights each having a different color, wherein the light sensor detects a change from illumination of the first signal light to illumination of the second signal light.

A3. The apparatus of paragraph A2, where the first signal light is a red signal light and the second signal light is a green signal light, and wherein the light sensor detects a change from illumination of the red signal light to illumination of the green signal light.

A4. The apparatus of any of paragraphs A1-A3, wherein the light sensor detects a change in color from light emitted from the loading dock signal light assembly.

A5. The apparatus of any of paragraphs A1-A4, wherein the light sensor detects a change in color from a red color to a green color of light emitted from the loading dock signal light assembly.

A6. The apparatus of any of paragraphs A1-A5, wherein the light sensor and the transmitter are in electrical communication via one or more wired connections.

A7. The apparatus of paragraph A6, wherein the receiver and the audio/visual device are in electrical communication via one or more wired connections.

A8. The apparatus of paragraph A7, wherein the transmitter and receiver are in wireless communication with each other.

A9. The apparatus of paragraph A7, wherein the transmitter and receiver are in wired communication with each other.

A10. The apparatus of any of paragraphs A1-A9, wherein the audio/visual device includes a speaker.

A11. The apparatus of any of paragraphs A1-A10, wherein the audio/visual device includes one or more lights.

A12. The apparatus of any of paragraphs A1-A11, wherein the audio/visual device includes an electric motor to produce one or more vibrations.

A13. The apparatus of any of paragraphs A1-13, further comprising a first microprocessor that receives the one or more detection signals from the light sensor and generates one or more first control signals to the transmitter.

A14. The apparatus of paragraph A13, wherein the transmitter sends the one or more transmitted signals in response to the one or more first control signals from the first microprocessor.

A15. The apparatus of any of paragraphs A1-A14, further comprising a second microprocessor that receives the one or more transmitted signals from the receiver and generates one or more second control signals to the audio/visual device.

A16. The apparatus of paragraph A15, wherein the audio/visual device generates the one or more audio/visual outputs in response to the one or more second control signals from the second microprocessor.

B1. A loading dock signal light change indicator apparatus, comprising:

a light sensor that detects a change from illumination of a red signal light to illumination of a green signal light from a loading dock signal light assembly, and that generates one or more detection signals in response to that detected change;

a transmitter that transmits one or more wireless signals in response to the one or more light sensor signals;

a receiver that receives the one or more wireless signals from the transmitter; and an audio/visual device that generates one or more audio or visual outputs in response to the receiver receiving the one or more wireless signals, wherein the audio/visual device is separate and distinct from the loading dock signal light assembly.

B2. The apparatus of paragraph B1, wherein the audio/visual device generates one or more audio and visual outputs in response to the receiver receiving the one or more wireless signals.

B3. The apparatus of paragraph B2, wherein the audio/visual device generates one or more vibratory outputs in response to the receiver receiving the one or more wireless signals.

C1. A method of alerting a driver in a cab of a truck parked in a loading dock, comprising:

detecting, via a light sensor located outside the cab, a change in which signal light of a loading dock signal light assembly at a loading dock is illuminated; and generating, via an audio/visual device located in the cab, at least one of audio or visual output indicating the detected change.

C2. The method of paragraph C1, where the loading dock signal light assembly includes first and second signal lights each having a different color, wherein detecting, via a light sensor located outside the cab, a change in which signal light of a loading dock signal light assembly at a loading dock is illuminated includes detecting, via the light sensor located outside the cab, a change from illumination of the first signal light to illumination of the second signal light.

C3. The method of paragraph C2, where first signal light is a red signal light and the second signal light is a green signal light, and wherein detecting, via the light sensor located outside the cab, a change from illumination of the first signal light to illumination of the second signal light includes detecting, via the light sensor located outside the cab, a change from illumination of the red signal light to illumination of the green signal light.

C4. The method of any of paragraphs C1-C3, wherein detecting, via a light sensor located outside the cab, a change of illumination from a loading dock signal light assembly at the loading dock includes detecting, via the light sensor located outside the cab, a change in color from light emitted from the loading dock signal light assembly.

C5. The method of paragraph C4, wherein detecting, via the light sensor located outside the cab, a change in color from light emitted from the loading dock signal light assembly includes detecting, via the light sensor located outside the cab, a change in color from red to green of the light emitted from the loading dock signal light assembly.

C6. The method of any of paragraphs C1-C5, further comprising transmitting, via a transmitter outside the cab, one or more signals in response to the detected change.

C7. The method of paragraph C6, further comprising receiving, via a receiver in the cab, the one or more transmitted signals.

C8. The method of paragraph C7, wherein generating, via an audio/visual device located in the cab, at least one of audio or visual output indicating the detected change includes generating the at least one of audio or visual output indicating the detected change in response to the one or more transmitted signals.

C9. The method of any of paragraphs C1-C8, wherein generating, via an audio/visual device located in the cab, at least one of audio or visual output indicating the detected change includes generating, via the audio/visual device located in the cab, one or more audio outputs.

C10. The method of any of paragraphs C1-C9, wherein generating, via an audio/visual device located in the cab, at least one of audio or visual output indicating the detected change includes generating, via the audio/visual device located in the cab, one or more visual outputs.

C11. The method of any of paragraphs C1-C10, further comprising generating, via the audio/visual device located in the cab, one or more vibratory outputs.

D1. A method of alerting a driver in a cab of a truck parked in a loading dock, comprising:
  detecting, via a light sensor outside the cab, a change from illumination of a red signal light to illumination of a green signal light from a loading dock signal light assembly at the loading dock;
  transmitting, via a transmitter outside the cab, one or more signals in response to the detected change;
  receiving, via a receiver in the cab, the one or more transmitted signals; and
  generating, via an audio/visual device in the cab, audio and visual outputs indicating the detected change in response to the one or more transmitted signals.

D2. The method of paragraph D1, further comprising generating, via the audio/visual device located in the cab, one or more vibratory outputs in response to the one or more transmitted signals.

The specific embodiments disclosed and illustrated herein are not to be considered in a limiting sense as numerous variations are possible. The subject matter of the present disclosure includes all novel and non-obvious combinations and subcombinations of the various elements, features, functions and/or properties of the embodiments disclosed herein. Similarly, where the claims recite "a" or "a first" element or the equivalent thereof, such claims should be understood to include incorporation of one or more such elements, neither requiring nor excluding two or more such elements.

Various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the present disclosure.

What is claimed is:

1. A loading dock signal light change indicator apparatus, comprising:
  a light sensor that detects variations in illumination of a loading dock signal light assembly, and that generates one or more detection signals representative of the variations in illumination of said loading dock signal light assembly;
  a transmitter that transmits one or more wireless signals based on said generation of said one or more detection signals; and
  a receiving data processing system that receives the one or more wireless signals from the transmitter and generates one or more audio or visual outputs based on the receiver receiving at least one of the one or more wireless signals, wherein said receiving data processing system is separate and distinct from the loading dock signal light assembly.

2. The apparatus of claim 1, wherein the receiving data processing system generates one or more vibratory outputs in response to the receiver receiving the one or more wireless signals.

3. The apparatus of claim 1, wherein the receiving data processing system is one of a smart phone, tablet computer, or wearable device.

4. The apparatus of claim 3, wherein an app is downloadable to the receiving data processing system that utilizes that receiving data processing system's existing alert functions as the one or more audio or visual outputs.

5. The apparatus of claim 1, wherein one or both of said transmitting data processing system and said receiving data processing system is a distributed data processing system.

6. The apparatus of claim 1, wherein the light sensor is removably mountable to said loading dock signal assembly.

7. The apparatus of claim 1, wherein said transmitter periodically transmits said wireless signal to said receiving data processing system; and
  said receiving data processing system automatically interprets said wireless signals to automatically determine whether to generate said one or more audio or visual outputs.

8. The apparatus of claim 1, wherein said transmitter transmits said wireless signal to said receiving data processing system in response to a detected variation in said illumination of said loading dock signal light assembly.

9. The apparatus of claim 8, wherein said detected variation is a change from illumination of a red signal light to illumination of a green signal light on said loading dock signal light assembly.

10. A loading dock signal light change indicator apparatus, comprising:
  a transmitting data processing system that detects variations in illumination of a loading dock signal light assembly, and that generates one or more detection signals representative of the variations in illumination of said loading dock signal light assembly;
  wherein said transmitting data processing system transmits one or more wireless signals based on the one or more detection signals; and
  a receiving data processing system that receives the one or more wireless signals from the transmitting data processing system and generates one or more audio or visual outputs based on the receiver receiving the one or more wireless signals, wherein both of said transmitting data processing system and said receiving data processing system are separate and distinct from the loading dock signal light assembly.

11. The apparatus of claim 10, wherein the receiving data processing system generates one or more vibratory outputs in response to the receiver receiving the one or more wireless signals.

12. The apparatus of claim 10, wherein the receiving data processing system is one of a smart phone, a tablet computer, or a wearable device.

13. The apparatus of claim 10, wherein one or both of said transmitting data processing system and/or said receiving data processing system is a distributed data processing system.

14. The apparatus of claim 10, wherein the transmitting data processing system is removably mountable to said loading dock signal assembly.

15. The apparatus of claim 10, wherein said transmitting data processing system periodically transmits said wireless signal to said receiving data processing system; and said receiving data processing system automatically interprets said wireless signals to automatically determine whether to generate said one or more audio or visual outputs.

16. The apparatus of claim 10, wherein said transmitting data processing system transmits said wireless signal to said receiving data processing system in response to a detected variation in said illumination of said loading dock signal light assembly.

17. The apparatus of claim 16, wherein said detected variation is a change from illumination of a red signal light to illumination of a green signal light on said loading dock signal light assembly.

* * * * *